United States Patent
Wagner et al.

(10) Patent No.: US 12,137,624 B2
(45) Date of Patent: Nov. 12, 2024

(54) METHOD FOR ADJUSTING THE POSITION OF A POWER LIFT

(71) Applicant: DEERE & COMPANY, Moline, IL (US)

(72) Inventors: Christoph Wagner, Reilingen (DE); Andreas Ahrens, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 796 days.

(21) Appl. No.: 17/196,255

(22) Filed: Mar. 9, 2021

(65) Prior Publication Data

US 2021/0368667 A1 Dec. 2, 2021

(30) Foreign Application Priority Data

Jun. 2, 2020 (DE) .......................... 102020206862.3

(51) Int. Cl.
  *B60K 35/00* (2024.01)
  *A01B 63/00* (2006.01)
  *B60K 35/10* (2024.01)

(52) U.S. Cl.
  CPC ............ *A01B 63/008* (2013.01); *B60K 35/10* (2024.01); *B60K 2360/126* (2024.01); *B60K 2360/128* (2024.01)

(58) Field of Classification Search
  CPC .............. B60K 35/00; B60K 2370/128; A01B 63/008; A01B 59/066; A01B 63/10; G05G 1/08; G05G 1/02
  USPC .......................................................... 701/51
  See application file for complete search history.

(56) References Cited

U.S. PATENT DOCUMENTS

| | | | | |
|---|---|---|---|---|
| 8,987,620 | B2* | 3/2015 | Gohng | G06F 3/0338 200/61.54 |
| 10,239,552 | B2* | 3/2019 | Bodtker | B62D 5/001 |
| 10,351,160 | B2* | 7/2019 | Nash | B62D 1/183 |
| 10,351,161 | B2* | 7/2019 | Buzzard | F16C 3/03 |
| 2019/0025869 | A1* | 1/2019 | Parazynski | G05G 1/02 |
| 2019/0281761 | A1* | 9/2019 | Corsetti | A01D 34/866 |
| 2020/0205335 | A1* | 7/2020 | Sakuma | A01B 63/111 |

(Continued)

FOREIGN PATENT DOCUMENTS

| | | | |
|---|---|---|---|
| DE | 3207546 A1 | 10/1982 | |
| DE | 102009016919 A1 * | 10/2010 | ........... A01B 63/111 |
| DE | 102019001159 A1 * | 8/2020 | |

(Continued)

OTHER PUBLICATIONS

Mars, Franck, Mathieu Deroo, and Jean-Michel Hoc. "Analysis of human-machine cooperation when driving with different degrees of haptic shared control." IEEE transactions on haptics 7.3 (2014): 324-333. (Year: 2014).*

(Continued)

*Primary Examiner* — Cuong H Nguyen

(57) ABSTRACT

A method for adjusting the position of a power lift of an agricultural utility vehicle includes storing one or more target positions in a control device, moving the control member rotationally relative to and translationally along a longitudinal axis, and adjusting the one or more target positions of the power lift within a position range defined by a lower limit position and an upper limit position by a variable movement of the control member.

20 Claims, 1 Drawing Sheet

(56) References Cited

U.S. PATENT DOCUMENTS

2020/0409406 A1* 12/2020 Stöhr ................... B60K 35/212
2021/0147192 A1* 5/2021 Klement ............ G01C 21/3647

FOREIGN PATENT DOCUMENTS

| EP | 3321763 B1 | 8/2019 | |
|---|---|---|---|
| EP | 3763182 A1 * | 1/2021 | ............. B60K 35/00 |
| EP | 3918892 A1 * | 12/2021 | ........... A01B 59/066 |
| KR | 20210147192 A * | 5/2020 | ............. H02S 50/10 |

OTHER PUBLICATIONS

Vinattieri, Francesco, et al. Target setting and structural design of an EPS-in-the-Loop test bench for steering feeling simulation. No. 2016-01-1559. SAE Technical Paper, 2016. (Year: 2016).*

Certosini, Cesare, et al. "Development of a real-time steering system model for driving simulators." Proceedings of the Institution of Mechanical Engineers, Part D: Journal of automobile engineering 233.11 (2019): 2701-2713. (Year: 2019).*

Extended European Search Report and Written Opinion issued in European Patent Application No. 21172520.5, dated Oct. 29, 2021, 7 pages.

* cited by examiner

METHOD FOR ADJUSTING THE POSITION OF A POWER LIFT

RELATED APPLICATIONS

This application claims priority to German Application No. 102020206862.3, filed Jun. 2, 2020, the disclosure of which is hereby expressly incorporated by reference in its entirety.

FIELD OF THE DISCLOSURE

The present disclosure relates to a method for adjusting a power lift of an agricultural utility vehicle into various positions.

BACKGROUND

Power lifts are used, among other things, to connect different attachments to the agricultural utility vehicle depending on the planned operation. For correct handling of the attachment, the power lift is able to be adjusted into various positions along a vehicle vertical line. For these adjustments, corresponding actuating elements which the driver has to operate are generally provided in the driver's cab of the utility vehicle.

There is a need to simplify for the driver the adjustment of the position of the power lift.

SUMMARY

According to the present disclosure, a method of the present disclosure uses a control member for adjusting the position of a power lift of an agricultural utility vehicle. The control member is rotationally movable relative to a longitudinal axis and translationally movable along this longitudinal axis. Various target positions of the power lift are located within or along a position range which is defined by a lower limit position and an upper limit position. The various target positions of the power lift are adjusted by a variable movement control of the control member. In other words, individual target positions of the power lift are adjusted by a specific translational movement or rotational movement of the control member.

The possibility of carrying out a rotational or translational control movement using the control member permits a plurality of different adjustments to be made to the position of the power lift using a single actuating element. Numerous and various actuating elements which are conventionally required for providing various adjustments to the position of the power lift may be dispensed with in a cost-saving manner. Moreover, this control member makes convenient handling and control of the power lift possible for the driver or user. This in turn assists the driver or user in a more efficient implementation of the respective operation.

The control member advantageously acts as a rotary wheel (rotational movement) with a pressing function (translation movement) in order to produce various positional adjustments.

Individual positional adjustments or target positions correspond either to a rotational movement or a translational movement or a combined rotational and translational movement. This combined control movement of the control member is implemented, in particular, by a rotational control movement and a translational control movement being carried out in each case at least once in succession. In this case, the sequence of the two types of movement (rotation and translation) may be variable as a function of the desired positional adjustment.

The different desired positional adjustments may be regarded as target positions which in each case correspond to a specific control movement of the control member.

The lower limit position and the upper limit position represent two extreme target positions which define the position range. The position range permits different vertical positions of the power lift to be adjusted. The position range extends, in particular, approximately along a vehicle vertical line.

The target positions may be located on an imaginary straight line or curved line of the position range.

The respective target position may be represented by a reference point of the power lift. For example, the reference point is a coupling point at the free end of a lower link of the power lift, an add-on unit (for example, an attachment or ballast weight) being coupled thereon to the power lift. Alternatively, the reference point is a different suitable point of the power lift.

The agricultural utility vehicle may be a tractor or towing vehicle.

The power lift is generally configured as a lifting apparatus. It is a rear or front power lift for the utility vehicle. In particular, the power lift is configured as a three-point power lift comprising an upper link and two lower links.

The power lift is able to be adjusted by the control member into different target positions which are appropriate for an efficient operation of the utility vehicle and thus are already predetermined or may be predetermined. As a result, positions which are important in the respective operation of the power lift, and optionally the add-on unit thereof, may be attained in a rapid, convenient and efficient manner. The predetermination of individual target positions may be carried out, for example, during the course of a calibration process before the actual operation of the utility vehicle with its power lift. This relates, in particular, to the lower and upper limit position. As a result, undesired extreme target positions and corresponding mechanical damage to the power lift and the utility vehicle when adjusting the position may be avoided in a reliable manner in terms of technology. Alternatively, individual target positions may also be defined or predetermined in a variable manner at different times. This relates, in particular, to a functional position which is appropriate for the driver or user between the lower limit position and the upper limit position.

The predetermined target positions are stored so that these positions are able to be recalled during the operation of the power lift. For example, the predetermined target positions are stored in a control device which serves for activating the power lift according to the movement control of the control member. The storage of individual target positions, in particular the functional position, may be carried out by multiple functions of the control member itself. For example, a current positional adjustment of the power lift may be stored by pressing the control member for a longer period of time (exceeding a predetermined latency period) in the translational direction thereof. Alternatively, an actuating element which is separate from the control member may be used for predetermining and storing at least one target position.

In particular, the predetermined functional position is a working position of the power lift for a working function of the utility vehicle by its add-on unit. As a result, an optimal vertical position of the add-on unit may be predetermined for the respective operation and if required rapidly adjusted. Various add-on units, in particular attachments, and various ground conditions of a field to be cultivated may be taken into consideration with the working position in a user-friendly manner, in order to assist an efficient operation.

In one embodiment, a plurality of functional positions, in particular working positions, are predetermined between the two limit positions. This is advantageous, for example, when a plurality of vertical positions for an attachment are appropriate during operation (for example, the variable nature of the agricultural soil to be cultivated in some areas).

The power lift is adjusted in an uncomplicated manner by control technology, by a translational control movement of the control member into the predetermined functional position. As a result, the power lift may be adjusted rapidly and accurately into the functional position. This is advantageous, for example, when the user desires to adjust or re-adjust an attachment by the power lift from a different current position into the predetermined working position during operation.

In order to permit a fine tuning of the positional adjustments of the power lift desired by the driver or user in a technically uncomplicated and convenient manner, starting from the adjusted functional position the power lift is adjusted by a rotational control movement of the control member into a lower or higher target position between the two limit positions.

Starting from any current position the power lift is adjusted into a next lower or next higher predetermined target position by a combined (translational and rotational) control movement of the control member. If such a predetermined target position is adjusted, starting from this position a next lower or next higher predetermined target position may be re-adjusted by the aforementioned combined control movement. This assists the user in the adjustment of the power lift into various predetermined target positions in a manner which is simple in terms of control technology. With the combined control movement, in particular, the translational control movement is carried out initially, followed by the rotational control movement.

By a suitable control movement of the control member a decision may be made as to whether the power lift is to be lowered or lifted, starting from a current positional adjustment. A different rotational direction of the rotational control movement is advantageously used therefore. The decision as to whether the power lift is to be lowered into a lower position (for example, a lower target position or next lower predetermined target position) or is to be lifted into a higher position (for example, a higher target position or next higher predetermined target position) is made as a function of a rotational direction of the rotational control movement. This assists an intuitive operation of the control member. In particular, a rotational movement of the control member in the clockwise direction corresponds to a desired lower position of the power lift, while a rotational movement of the control member counter to the clockwise direction corresponds to a desired higher position of the power lift.

In a further embodiment, a signaling procedure is carried out as soon as a movement position of the control member which represents a predetermined target position of the power lift is attained. As a result, the driver or user is automatically informed in the manner of an assist function, which assists the operation, and which further facilitates the control of the power lift.

The signaling procedure is configured, for example, haptically or acoustically or optically.

A haptic signaling procedure is carried out by the rotational control movement being braked or stopped when the aforementioned movement position of the control member is attained (for example, by an electronically controlled braking unit).

Alternatively, for the haptic signaling procedure the control member may be moved abruptly in a translational manner counter to the usual translational control movement direction (for example, by a spring or an electromagnet) as soon as the movement position of the control member representing a predetermined target position of the power lift is attained. After a signaling time has elapsed, the control member is again automatically moved back into its last movement position in a translational manner.

For a haptic signaling procedure, a brief vibration of the control member may be provided.

For an acoustic signaling procedure, an acoustic signal may be generated on the control member itself or outside the control member (and in the driver's cab).

The above-described feature of a signaling procedure is not necessarily limited to the use of a predetermined target position as claimed in the claims. Rather, the idea of the signaling procedure may be used, with its various embodiments disclosed in the claims or the description or the drawings, for any control member with any movement control and any movement position, the attainment thereof representing any predetermined or predefined target position of a power lift. This independent idea of a signaling procedure, when a movement position of the control member representing a target position of the power lift is attained, may be combined with any feature of the claims or the description or the drawings.

An arrangement may be provided with the control member for adjusting the position of the power lift. This arrangement contains a control device which receives the different control movements of the control member in the form of corresponding movement control signals. As a function of these movement control signals and optionally further parameters, the control device controls the power lift in order to lift or lower the power lift according to the control movements of the control member. For example, the control device activates hydraulic control valves which in the known manner effect a hydraulic lifting and lowering of the power lift. Additionally, the control device also implements one of the above-described embodiments of the signaling procedure on the control member itself or on a signal unit which is outside the control member.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
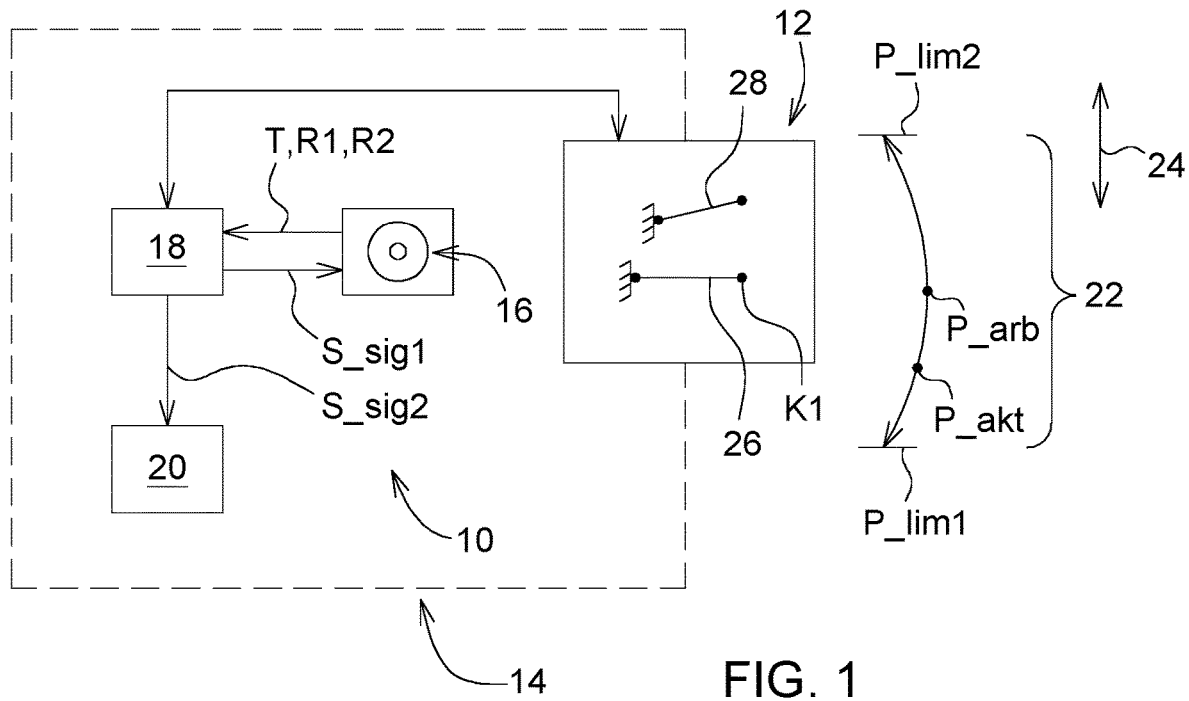
FIG. 1 shows an arrangement in the manner of a block diagram for carrying out the method according to the present disclosure.

FIG. 1 shows schematically an arrangement 10 for adjusting the position of a power lift 12. The power lift 12 is mounted in the known manner on an agricultural utility vehicle 14. The arrangement 10 is a constituent part of the utility vehicle 14 and, in particular, integrated in a driver's cab, not shown here. The arrangement 10 contains in addition to a manually actuatable control member 16 at least one further control device 18. A signal unit 20 for an acoustic signaling (for example, a loudspeaker) or an optical signaling (for example, a display, screen, warning lamp) of a specific movement position of the control member 16 is also optionally contained therein.

Various target positions of the power lift 12 may be adjusted by the control member 16. These target positions are located on an imaginary position range 22 which is defined along a vehicle vertical line 24 by a lower limit position P_lim1 and an upper limit position P_lim2.

The power lift 12 may be transferred into different target positions by a variable movement control of the control member 16, to be described further. The individual positions on the position range 22 represent a suitable point of the power lift 12, for example, a coupling point K1 of a lower link 26. An add-on unit (for example, an attachment or ballast weight) may be coupled on in the conventional manner by two parallel lower links 26 and an upper link 28, as constituent parts of a three-point power lift.

The two limit positions P_lim1 and P_lim2 are predetermined and stored in the control device 18. The movement control is defined in the control device 18 such that a target position to be adjusted is not able to fall below the lower limit position P_lim1 or exceed the upper limit position P_lim2. Between the two limit positions P_lim1, P_lim2, at least one further functional position which is appropriate for the power lift 12 may be predetermined as the target position and stored in the control device 18. Such a functional position, for example, is a working position P_arb of the power lift 12, the specific vertical adjustment thereof having to be maintained for an efficient operation of the attachment used on the field to be cultivated. A plurality of various working positions P_arb may also be predetermined along the position range for the same operation, for example, in a field to be cultivated with variable ground conditions in some areas. Thus, the respectively appropriate working position P_arb may be adjusted as the new target position as a function of the cultivated field portion.

Figure 2:
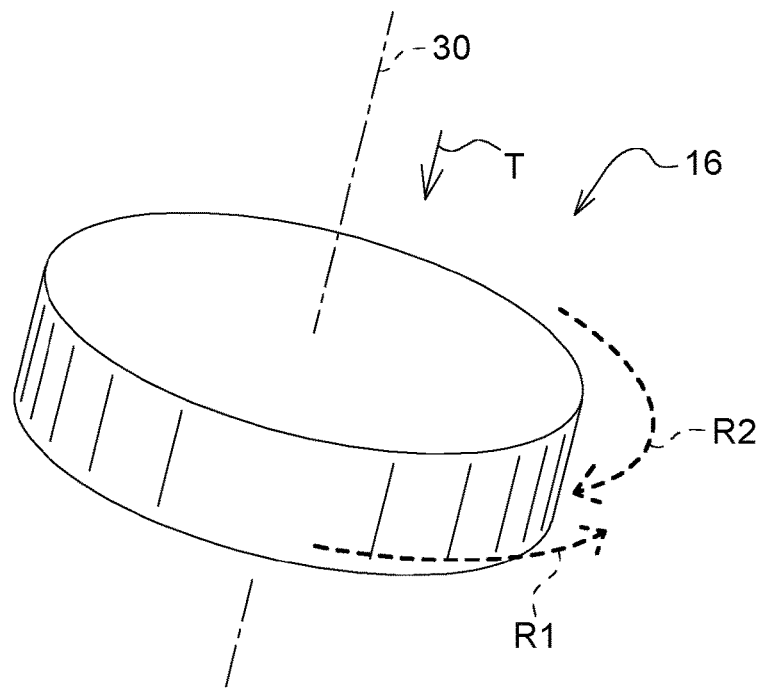
FIG. 2 shows a perspective and schematic view of a control member as a constituent part of the arrangement.

In FIG. 2, the control member 16 is shown schematically as a combined push-turn wheel or as a push-turn actuator. The control member 16 is rotationally movable relative to a longitudinal axis 30, while the control member is translationally movable along this longitudinal axis 30. The rotational mobility permits two control rotational directions R1 (for example, counter to the clockwise direction) and R2 (for example, in the clockwise direction) in opposing rotational directions. A translational control longitudinal direction T corresponds to the direction of a compressive force onto the control member 16.

The logic of the movement control for the control member 16 is described hereinafter. By a translational control movement of the control member 16 in the control longitudinal direction T, the power lift 12 is adjusted into the predetermined functional position or working position P_arb or adjusted into one of a plurality of predetermined functional positions or working positions P_arb. Starting from the adjusted functional position or working position P_arb the power lift 12 is adjusted by a rotational control movement of the control member 16 either into a lower or higher target position between the two limit positions P_lim1, P_lim2. In this case, the rotational control movement for a lower target position follows the control rotational direction R2 in the clockwise direction, while the rotational control movement counter to the clockwise direction (control rotational direction R1) effects a higher target position of the power lift 12.

Starting from any current position of the power lift 12 on the position range 22, the power lift 12 is adjusted by a combined translational control movement (control longitudinal direction T) and subsequent rotational control movement of the control member 16 either into a next lower predetermined target position or a next higher predetermined target position. In this case, the rotational control movement in the clockwise direction (control direction R2) causes an adjustment of the power lift 12 into the next lower predetermined target position, while the rotational control movement counter to the clockwise direction (control rotational direction R1) causes an adjustment of the power lift 12 into the next higher predetermined target position.

The power lift 12 is located, for example, in a current position P_akt between the predetermined lower limit position P_lim1 and the predetermined working position P_arb. By a translational control movement in the control longitudinal direction T the power lift 12 is then automatically lifted into the working position P_arb. Starting from this adjusted working position P_arb the power lift 12 may be lifted further in the direction of the upper limit position P_lim2, by the control member 16 being rotated in the control rotational direction R1. Similarly, starting from the adjusted working position P_arb the power lift 12 may be lowered again in the direction of the lower limit position P_lim1 by the control member 16 being rotated in the opposing control rotational direction R2.

Starting from the adjusted current position P_akt the power lift 12 may be automatically adjusted by the above-described combined translational and subsequent rotational control movement into the next lower predetermined target position (which corresponds to the lower limit position P_lim1) or into the next higher predetermined target position (which corresponds to the working position P_arb). Starting from the adjusted working position P_arb the combined translational and subsequent rotational control movement may be carried out again in order to adjust the power lift 12 automatically into the upper limit position P_lim2.

During the movement control, as soon as the control member 16 attains a movement position which represents a predetermined target position (for example, P_lim1 or P_lim2 or P_arb) of the power lift 12, the control device 18 transmits specific control signals S_sig1 to the control member 16 or specific control signals S_sig2 to the signal unit 20 which signal to the driver or user the movement position attained by the control member 16. As the signaling procedure, for example, the control signals S_sig1 actuate an electronically activated braking unit to brake or stop a rotational control movement R1 or R2 of the control member 16. Alternatively, the control signals S_sig1 (for example, via an activated spring mechanism or electromagnet) may cause the control member 16 to be moved automatically counter to the control longitudinal direction T in a translational manner. The control member 16 may also be set into a haptic-mechanical vibration by the control signals S_sig1. Moreover, the control signals S_sig1 may generate acoustic signaling on the control member 16.

The control signals S_sig2 may generate in the signal unit 20 acoustic signaling or optical signaling for the driver or user.

It should be mentioned that individual details are not necessarily shown to scale in the drawings.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method for adjusting, via a control member, the position of a power lift of an agricultural utility vehicle, comprising:
   storing one or more target positions of the power lift in a control device;
   moving the control member rotationally relative to and translationally along a longitudinal axis;
   adjusting the power lift to one of the stored target positions by at least a translational control movement of the control member; and
   adjusting the one or more target positions of the power lift within a position range defined by a lower limit position and an upper limit position by movement of the control member.

2. The method as claimed in claim 1, further comprising adjusting the power lift by the control member into predetermined target positions comprising a predetermined lower limit position, a predetermined upper limit position, and a predetermined functional position between the lower limit position and the upper limit position.

3. The method as claimed in claim 2, wherein the predetermined functional position comprises a working position of the power lift for a working function of the utility vehicle.

4. The method as claimed in claim 3, wherein the power lift is adjusted by the translational control movement of the control member into the predetermined functional position and further adjusted by a rotational control movement of the control member into a lower or higher target position between the two limit positions.

5. The method as claimed in claim 2, wherein, starting from the predetermined functional position, further comprising adjusting the power lift by a rotational control movement of the control member into a lower or higher target position between the two limit positions.

6. The method as claimed in claim 2, wherein the power lift is adjusted by a combined translational and rotational control movement of the control member into a next lower or next higher predetermined target position.

7. The method as claimed in claim 6, further comprising determining between the lower target position or next lower predetermined target position as a function of a rotational direction of the rotational control movement.

8. The method as claimed in claim 6, further comprising determining between the higher target position or next higher predetermined target position as a function of a rotational direction of the rotational control movement.

9. The method as claimed in claim 1, further comprising carrying out a signaling procedure when a movement position of the control member representing a predetermined target position of the power lift is attained.

10. The method as claimed in claim 9, further comprising braking the rotational control movement of the control member for the signaling procedure.

11. The method as claimed in claim 9, further comprising moving the control member in a translational manner counter to the translational control movement for the signaling procedure.

12. The method as claimed in claim 9, further comprising setting the control member into a mechanical vibration for the signaling procedure.

13. The method as claimed in claim 9, further comprising generating an acoustic signal on the control member or outside the control member for the signaling procedure.

14. An arrangement for adjusting the position of a power lift of an agricultural utility vehicle, comprising:
   a control member rotationally movable relative to and translationally movable along a longitudinal axis;
   a plurality of target positions of the power lift being adjustable within a position range, the position range being defined by a lower limit position and an upper limit position by movement control of the control member; and
   a control device configured to store the plurality of target positions of the power lift;
   wherein the power lift is adjustable to one of the stored target positions by at least a translational control movement of the control member.

15. The arrangement of claim 14, wherein the power lift is adjusted by the control member into predetermined target positions comprising a predetermined lower limit position, a predetermined upper limit position, and a predetermined functional position between the lower limit position and the upper limit position.

16. The arrangement as claimed in claim 15, wherein the predetermined functional position comprises a working position of the power lift for a working function of the utility vehicle.

17. The arrangement as claimed in claim 16, wherein the power lift is adjusted by the translational control movement of the control member into the predetermined functional position and further adjusted by a rotational control movement of the control member into a lower or higher target position between the two limit positions.

18. The arrangement as claimed in claim 15, wherein, starting from the predetermined functional position, further comprising adjusting the power lift by a rotational control movement of the control member into a lower or higher target position between the two limit positions.

19. The arrangement as claimed in claim 15, wherein the power lift is adjusted by a combined translational and rotational control movement of the control member into a next lower or next higher predetermined target position.

20. A method for adjusting the position of a power lift of an agricultural utility vehicle, comprising:
   storing one or more target positions of the power lift in a control device;
   moving the control member rotationally relative to and translationally along a longitudinal axis;
   adjusting the power lift to one of the stored target positions by at least a translational control movement of the control member;
   adjusting the one or more target positions of the power lift within a position range defined by a lower limit position and an upper limit position by movement of the control member; and carrying out a signaling procedure when a movement position of the control member representing a predetermined target position of the power lift is attained;

wherein, the carrying out step comprises at least one of:
braking the rotational control movement of the control member for the signaling procedure;
moving the control member in a translational manner counter to the translational control movement for the signaling procedure;
setting the control member into a mechanical vibration for the signaling procedure;
generating an acoustic signal on the control member or outside the control member for the signaling procedure.

* * * * *